US010867095B2

(12) United States Patent
Leong et al.

(10) Patent No.: US 10,867,095 B2
(45) Date of Patent: Dec. 15, 2020

(54) METHODS AND APPARATUS FOR SECURE IMPLEMENTION OF INTEGRATED CIRCUITS

(71) Applicant: Intel Corporation, Santa Clara, CA (US)

(72) Inventors: Han Hua Leong, Penang (MY); Nigel Gulstone, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/357,759

(22) Filed: Mar. 19, 2019

(65) Prior Publication Data

US 2019/0213295 A1 Jul. 11, 2019

(51) Int. Cl.
*G06F 17/20* (2006.01)
*G06F 30/34* (2020.01)
*G06F 30/30* (2020.01)
*H03K 19/17728* (2020.01)
*G06F 111/20* (2020.01)
*H03K 19/173* (2006.01)

(52) U.S. Cl.
CPC ............. *G06F 30/34* (2020.01); *G06F 30/30* (2020.01); *H03K 19/17728* (2013.01); *G06F 2111/20* (2020.01); *H03K 19/1733* (2013.01)

(58) Field of Classification Search
CPC ...... G06F 30/34; G06F 30/30; G06F 2111/20; H03K 19/17728; H03K 19/1733
See application file for complete search history.

(56) References Cited

U.S. PATENT DOCUMENTS

| 6,078,736 | A | 6/2000 | Guccione |
| 6,172,520 | B1 | 1/2001 | Lawman et al. |
| 6,301,695 | B1 | 10/2001 | Burnham et al. |
| 6,308,311 | B1 * | 10/2001 | Carmichael ............ G06F 30/34 |
| | | | 716/117 |
| 7,218,137 | B2 | 5/2007 | Vadi et al. |
| 7,233,532 | B2 | 6/2007 | Vadi et al. |
| 7,576,561 | B1 * | 8/2009 | Huang ............. H03K 19/17748 |
| | | | 326/38 |
| 7,599,299 | B2 * | 10/2009 | Goetting ........ G01R 31/318536 |
| | | | 327/371 |
| 8,127,130 | B2 | 2/2012 | Ellis |

(Continued)

*Primary Examiner* — Nghia M Doan

(57) ABSTRACT

An integrated circuit may include a reconfigurable functional circuit block coupled to a microcontroller. The microcontroller may monitor a trigger register that receives trigger signals at a reconfiguration portion. The trigger signals may initiate corresponding reconfiguration operations by triggering the execution of instructions in a reconfiguration sequence program to load appropriate configuration data to configuration registers. The configuration registers may determine the operating mode of the functional circuit block by activating a subcomponent module in the functional circuit block. By providing a reconfiguration port that has full control of the reconfiguration of the functional circuit block, sensitive information regarding the implementation of the functional circuit block, the microcontroller, and connections therebetween may be protected while simplifying the design process for a custom logic circuit generated based on the reconfigurable functional circuit block.

19 Claims, 8 Drawing Sheets

(56) References Cited

U.S. PATENT DOCUMENTS

| | | | |
|---|---|---|---|
| 8,352,898 B1* | 1/2013 | Kellermann | G06F 30/34 716/117 |
| 9,483,416 B1 | 11/2016 | Lu et al. | |
| 10,528,513 B1* | 1/2020 | Chan | G06F 1/10 |

* cited by examiner

METHODS AND APPARATUS FOR SECURE IMPLEMENTION OF INTEGRATED CIRCUITS

BACKGROUND

This relates to integrated circuits and, more particularly, to improving the design of integrated circuits.

As an example, programmable integrated circuits are a type of integrated circuit that can be programmed by a user such as an application designer or logic designer to implement a custom logic function for an application. In a typical scenario, logic designers use computer-aided design tools to design a custom logic circuit based on different functional circuit blocks in a design library (e.g., based on intellectual property (IP) cores or blocks in the design library). When the design process is complete, the computer-aided design tools generate configuration data. The configuration data is used to configure the integrated circuit to perform the functions of the custom logic circuit.

In general, designing the custom logic circuit from the different functional circuit blocks require a complex series of operations and a thorough understanding of the inner-workings of the different functional circuit blocks (e.g., IP blocks) on the part of the logic designers, unnecessarily burdening them with extraneous details peripheral to their core purpose of designing and implementing logic circuits. Additionally, by providing the inner-workings of the different functional circuit blocks to the logic designers or other users, IP block providers expose their IP blocks, which are then subject to undesired duplication and modification. Accordingly, integrated circuits with improved designs are needed to simplify the logic design process for the logic designers and to secure the implementation details of the functional circuit blocks (e.g., IP blocks) for the IP block providers.

It is within this context that the embodiments described herein arise.

DETAILED DESCRIPTION

Embodiments of the present invention relate to methods and apparatus for implementing secure functional circuit blocks and efficiently generating custom logic circuits on integrated circuits based on the functional circuit blocks. A user such as an IP provider (i.e., IP designer) may generate reconfigurable functional circuit blocks. A functional circuit block may include multiple subcomponents or modules that are switched into use (e.g., during a reconfiguration operation that switches between a first mode of operation to a second mode of operation). A reconfiguration port may be associated with the subcomponents in the functional circuit block. As an example, the reconfiguration port may include multiple paths each of which receives a trigger signal associated with a corresponding subcomponent. The functional circuit blocks and control circuitry (e.g., microcontroller) associated with the functional circuit blocks may be encrypted.

An additional user such as a logic designer may use the reconfigurable functional circuit blocks and the reconfiguration port to implement custom logic circuits having reconfiguration functions. As such, the IP provider may limit access to sensitive information associated with the inner-workings of the functional circuit blocks (e.g., IP blocks) while providing the application designers with simplified access to reconfiguration functions when implementing custom logic circuits (e.g., through a reconfiguration port).

It will be recognized by one skilled in the art, that the present exemplary embodiments may be practiced without some or all of these specific details. In other instances, well-known operations have not been described in detail in order not to unnecessarily obscure the present embodiments.

Figure 1:
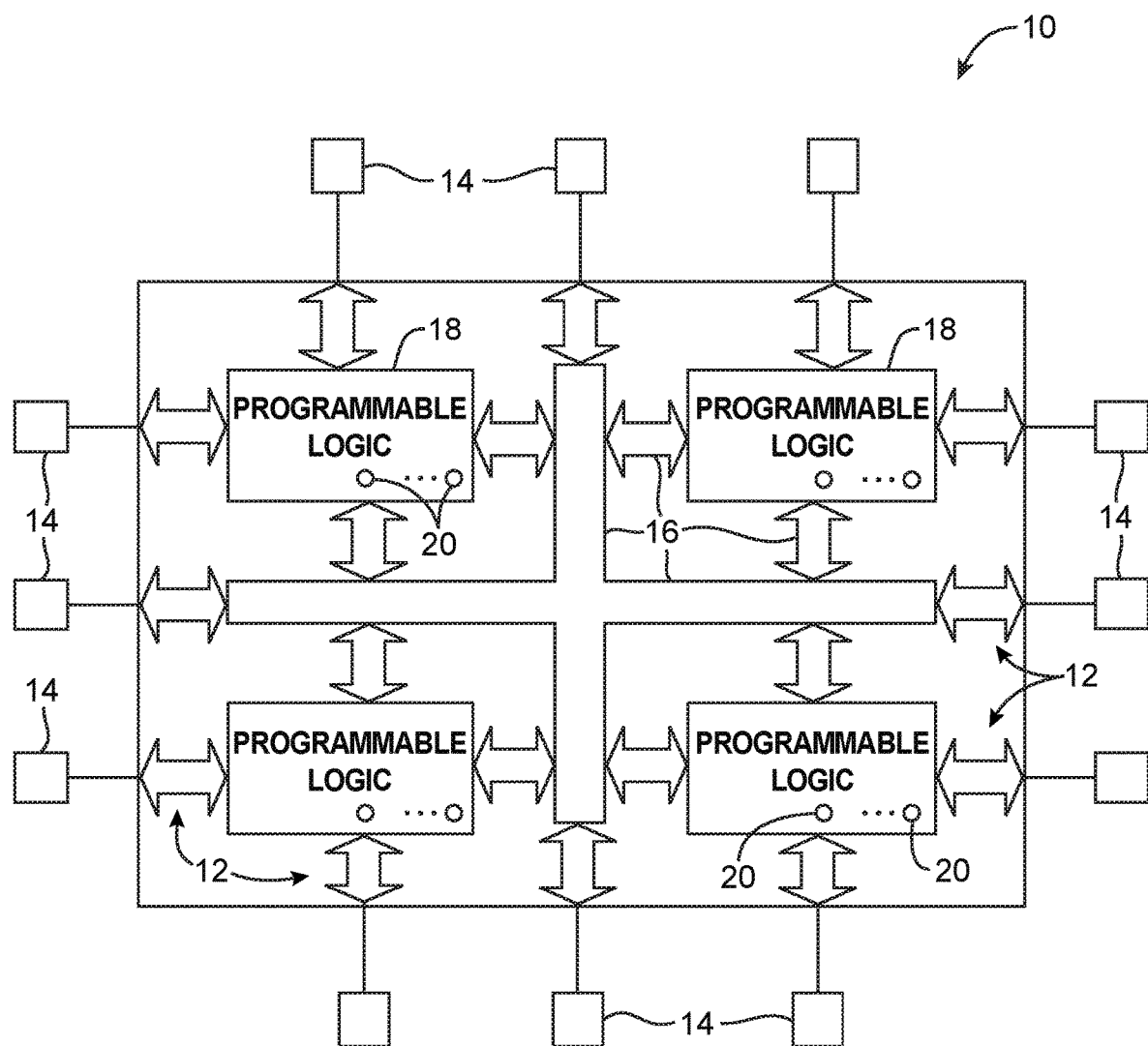
FIG. 1 is a diagram of an illustrative programmable integrated circuit in accordance with some embodiments.

An illustrative programmable integrated circuit such as programmable logic device (PLD) 10 is shown in FIG. 1. As shown in FIG. 1, programmable integrated circuit 10 may have input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function.

Programmable integrated circuit 10 contains memory elements 20 that can be loaded with configuration data (also called programming data) using pins 14 and input-output circuitry 12. Once loaded, the memory elements 20 may each provide a corresponding static control output signal that controls the state of an associated logic component in programmable logic 18. Typically, the memory element output signals are used to control the gates of metal-oxide-semiconductor (MOS) transistors. Some of the transistors may be p-channel metal-oxide-semiconductor (PMOS) transistors. Many of these transistors may be n-channel metal-oxide-semiconductor (NMOS) pass transistors in programmable components such as multiplexers. When a memory element output is high, an NMOS pass transistor controlled by that memory element will be turned on to pass logic signals from its input to its output. When the memory element output is low, the pass transistor is turned off and does not pass logic signals.

A typical memory element 20 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 20, so CMOS-based memory element implementations are described herein as an example. In the context of programmable integrated circuits, the memory elements store configuration data and are therefore sometimes referred to as configuration random-access memory (CRAM) cells.

Figure 2:
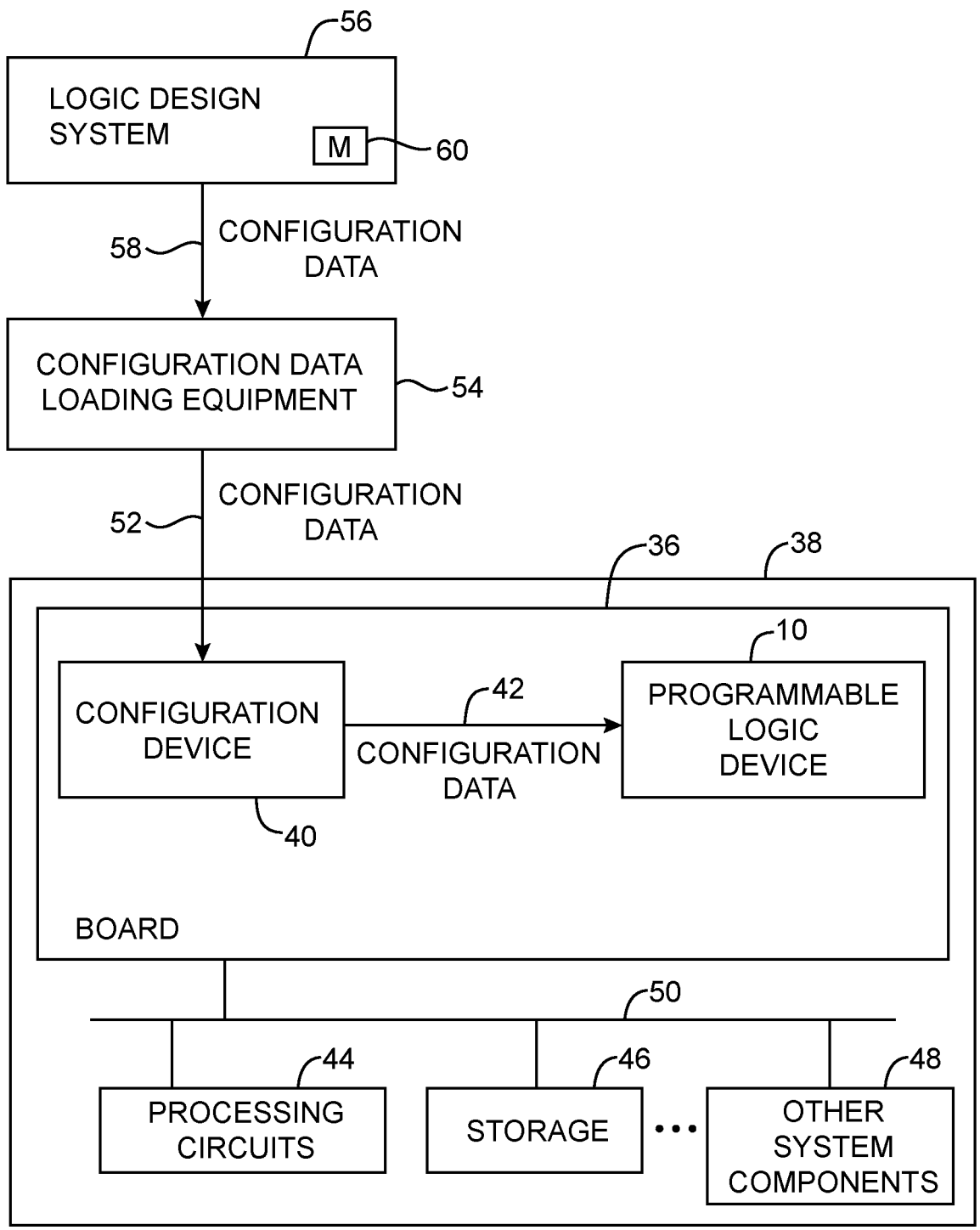
FIG. 2 is a diagram showing how configuration data is created by a logic design system and loaded into a programmable device to configure the device for operation in a system in accordance with some embodiments.

An illustrative system environment for device 10 is shown in FIG. 2. Device 10 may be mounted on a circuit board 36 in a system 38. In general, programmable logic device 10 may receive configuration data from programming equipment or from other suitable equipment or device. In the example of FIG. 2, programmable logic device 10 is the type of programmable logic device that receives configuration data from an associated integrated circuit 40.

With this type of arrangement, circuit 40 may, if desired, be mounted on the same board 36 as programmable logic device 10. If desired, configuration device 40 and programmable logic device 10 may be implemented as two separate chiplet dies that respectively form two modular portion of a larger chip system (having multiple chiplet dies that are communicatively connected to function integrally in the larger chip system). If desired, configuration device 40 and programmable logic device 10 may be implemented on the same integrated circuit die.

Circuit 40 may be an erasable-programmable read-only memory (EPROM) chip, a programmable logic device configuration data loading chip with built-in memory (sometimes referred to as a "configuration device"), or other suitable device. When system 38 boots up (or at another suitable time), the configuration data for configuring the programmable logic device may be supplied to the programmable logic device from device 40, as shown schematically by path 42. The configuration data that is supplied to the programmable logic device may be stored in the programmable logic device in its configuration random-access-memory elements 20.

System 38 may include processing circuits 44, storage 46, and other system components 48 that communicate with device 10. The components of system 38 may be located on one or more circuit boards such as circuit board 36 or other suitable mounting structures or housings and may be interconnected by buses, traces, and other electrical paths 50.

Configuration device 40 may be supplied with the configuration data for device 10 over a path such as path 52. Configuration device 40 may, for example, receive the configuration data from configuration data loading equipment 54 or other suitable equipment that stores this data in configuration device 40. Device 40 may be loaded with data before or after installation on board 36.

It can be a significant undertaking to design and implement a desired logic circuit in a programmable logic device. Logic designers therefore generally use logic design systems based on computer-aided-design (CAD) tools to assist them in designing circuits. A logic design system can help a logic designer design and test complex circuits for a system or application. When a design is complete, the logic design system may be used to generate configuration data (sometimes referred to as a configuration bitstream) for electrically programming the appropriate programmable logic device.

As shown in FIG. 2, the configuration data produced by a logic design system 56 may be provided to equipment 54 over a path such as path 58. The equipment 54 provides the configuration data to device 40, so that device 40 can later provide this configuration data to the programmable logic device 10 over path 42. Logic design system 56 may be based on one or more computers and one or more software programs. In general, software and data may be stored on any computer-readable medium (storage) in system 56 and is shown schematically as storage 60 in FIG. 2.

In a typical scenario, logic design system 56 is used by a logic designer to create a custom circuit design. System 56 produces corresponding configuration data which is provided to configuration device 40. Upon power-up, configuration device 40 and data loading circuitry on programmable logic device 10 is used to load the configuration data into CRAM cells 20 of device 10. Device 10 may then be used in normal operation of system 38.

After device 10 is initially loaded with a set of configuration data (e.g., using configuration device 40), device 10 may be reconfigured by loading a different set of configuration data. Sometimes it may be desirable to reconfigure only a portion of the memory cells on device 10 via a process sometimes referred to as partial reconfiguration. As memory cells are typically arranged in an array, partial reconfiguration can be performed by writing new data values only into selected portion(s) in the array while leaving portions of array other than the selected portion(s) in their original state.

Figure 3:
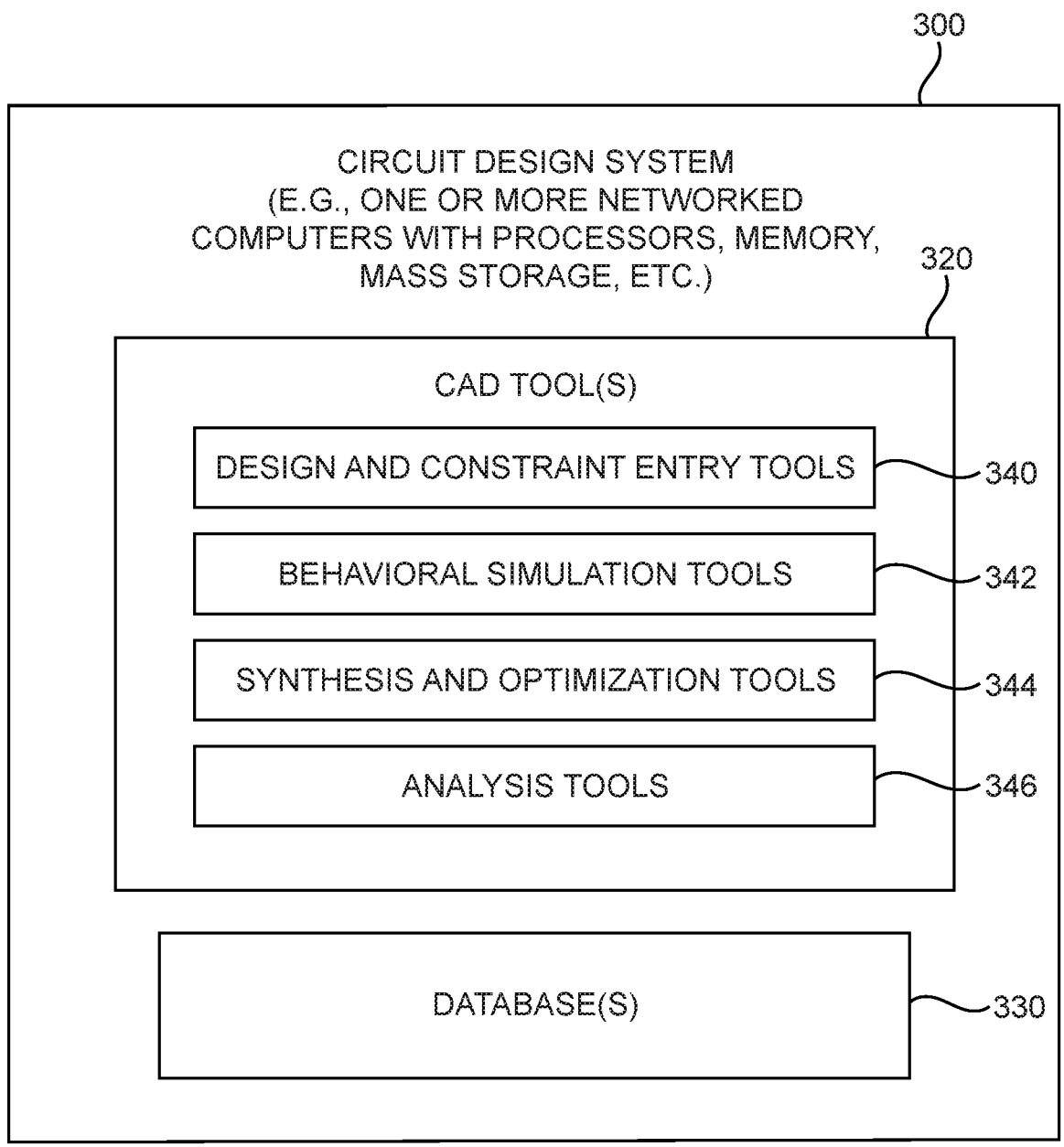
FIG. 3 is a diagram of a circuit design system having various computer-aided design (CAD) tools that can be used to design integrated circuits in accordance with some embodiments.

An illustrative circuit design system 300 in accordance with an embodiment is shown in FIG. 3. If desired, circuit design system of FIG. 3 may be used in a logic design system such as logic design system 56 shown in FIG. 2. Circuit design system 300 may be implemented on integrated circuit design computing equipment. For example, system 300 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 320 and databases 330 reside on system 300. During operation, executable software such as the software of computer aided design tools 320 runs on the processor(s) of system 300. Databases 330 are used to store data for the operation of system 300. In general, software and data may be stored on non-transitory computer readable storage media (e.g., tangible computer readable storage media). The software code may sometimes be referred to as software, data, program instructions, instructions, or code. The non-transitory computer readable storage media may include computer memory chips such as read-only memory (ROM), non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, floppy diskettes, tapes, or any other suitable memory or storage device(s).

Software stored on the non-transitory computer readable storage media may be executed on system 300. When the software of system 300 is installed, the storage of system 300 has instructions and data that cause the computing equipment in system 300 to execute various methods or processes. When performing these processes, the computing equipment is configured to implement the functions of circuit design system 300.

Computer aided design (CAD) tools 320, some or all of which are sometimes referred to collectively as a CAD tool, a circuit design tool, or an electronic design automation (EDA) tool, may be provided by a single vendor or by multiple vendors. Tools 320 may be provided as one or more suites of tools (e.g., a compiler suite for performing tasks associated with implementing a circuit design in a programmable logic device) and/or as one or more separate software components (tools). Database(s) 330 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Still referring to FIG. 3, computer aided design tools 320 that may be used in a circuit design system may include design and constraint entry tools 340. In particular, the design process for the logic designer may start with the formulation of functional specifications of the integrated circuit design (e.g., a functional or behavioral description of the integrated circuit design). The logic designer may specify the functional operation of a desired circuit design using design and constraint entry tools 340. Design and constraint entry tools 340 may include tools such as design and constraint entry aids and design editors. Design and constraint entry aids may be used to help a logic designer locate a desired design (e.g., one or more desired functional circuit block, one or more IP blocks, etc.) from a library of existing circuit designs and may provide computer-aided assistance to the logic designer for entering, specifying, or obtaining the desired circuit design.

As an example, design and constraint entry aids may be used to present screens of options for a user (e.g., a logic designer). The user may click on on-screen options to select whether the circuit being designed should have certain features (e.g., the function of the functional circuit block, the configurability/reconfigurability of the functional circuit block, subcomponents that may be implanted in the functional circuit block, etc.). Design editors may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 340 may be used to allow a logic designer to provide a desired circuit design using any suitable format. For example, design and constraint entry tools 340 may include tools that allow the logic designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 340 may include a schematic capture tool. A schematic capture tool may allow the logic designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 340 may allow the logic designer to provide a circuit design software application code to the circuit design system 300 using a hardware description language such as Verilog hardware description language (Verilog HDL), Very High Speed Integrated Circuit Hardware Description Language (VHDL), SystemVerilog, or a higher-level circuit description language such as OpenCL, SystemC, C/C++, just to name a few. The designer of the integrated circuit design can enter the circuit design by writing the application code with an editor as part of entry tools 340. Blocks of code may be imported from user-maintained or commercial libraries if desired.

In order to assist logic or application designers in implementing custom logic circuits, IP providers or designers may provide pre-built circuit blocks that serves as building blocks in implementing the custom logic circuits. Each of these circuit blocks may serve a particular function and is therefore sometimes referred to herein as functional circuit blocks. IP designers may similarly use a circuit design system (e.g., of the same type as circuit design system 300 including design and constraint entry tools, behavioral simulation tools, synthesis and optimization tools, analysis tools, etc.) to generate these functional circuit blocks and provide these functional circuit blocks, associated support circuitry (e.g., control and storage circuitry that assist in the operation of these functional circuit blocks), and data files (e.g., metadata describing the functionalities of these functional circuit blocks, metadata describing the necessary associated circuitry for operating these functional circuit blocks, configuration data that configure these functional circuit blocks in corresponding modes of operation, etc.) to a design library such as a functional circuit block library or an IP block library. The design library may be provided as part of entry tools 340 (e.g. design entry aids in entry tools 340) as an example.

After the design has been entered using design and constraint entry tools 340, behavioral simulation tools 342 may be used to simulate the functionality of the circuit design. If the functionality of the design is incomplete or incorrect, the logic designer can make changes to the circuit design using design and constraint entry tools 340. The functional operation of the new circuit design may be verified using behavioral simulation tools 342 before synthesis operations have been performed using tools 344. Simulation tools such as behavioral simulation tools 342 may also be used at other stages in the design flow if desired (e.g., after logic synthesis). The output of the behavioral simulation tools 342 may be provided to the logic designer in any suitable format (e.g., truth tables, timing diagrams, etc.).

Once the functional operation of the circuit design has been determined to be satisfactory, synthesis and optimization tools 344 may generate a gate-level netlist of the circuit design (e.g., in a logic synthesis step), for example using gates from a particular library pertaining to a targeted process supported by a foundry, which has been selected to produce the integrated circuit. Alternatively, synthesis and optimization tools 344 may generate a gate-level netlist of the circuit design using gates of a targeted programmable logic device (i.e., in the logic and interconnect resources of a particular programmable logic device product or product family) in a logic synthesis step. Synthesis and optimization tools 344 may also optimize the design by making appropriate selections of hardware to implement different logic functions in the circuit design based on the circuit design data and constraint data entered by the logic designer using entry tools 340.

After logic synthesis and optimization, the circuit design system may use synthesis tools 344 for placement, routing, and physical synthesis to perform physical design steps (e.g., layout synthesis operations). As examples, physical synthesis tools may be used to determine where to place each gate of the gate-level netlist produced by logic synthesis tools, may locate interacting counters in adjacent regions to reduce interconnect delays or to satisfy timing requirements specifying the maximum permitted interconnect delay, or may generally create orderly and efficient implementations of circuit designs for any targeted integrated circuit (e.g., for a given programmable integrated circuit such as a field-programmable gate array (FPGA)).

Tools such as logic synthesis and/or physical synthesis tools 344 may be part of a compiler suite (e.g., part of a suite of compiler tools provided by a programmable logic device vendor). In some embodiments, synthesis tools 344 may also include timing analysis tools such as timing estimators that allows synthesis tools 344 to satisfy performance requirements (e.g., timing requirements) before actually producing the integrated circuit.

After an implementation of the desired circuit design has been generated using synthesis tools 344, the implementation of the design may be analyzed and tested using analysis tools 346. For example, analysis tools 346 may include timing analysis tools, power analysis tools, or formal verification tools, just to name few. After satisfactory optimization operations have been completed using tools 320 and depending on the targeted integrated circuit technology, tools 320 may produce a mask-level layout description of the integrated circuit or configuration data for programming the programmable logic device.

As mentioned in connection with design and constraint entry tools 340, CAD tools 320 may include circuit design libraries having various functional circuit blocks, IP blocks, or other existing modular circuit designs for use in implementing the desired circuit design for a custom function application. IP providers may generate these functional circuit blocks, support circuitry for these functional circuit blocks, and data regarding these functional circuit blocks (e.g., data describing the function of these functional circuit blocks, compatibility with various subcomponents in these functional circuit blocks, interfacing with support circuitry and/or other functional circuit blocks, physical and logical constraints of these functional circuit blocks, configurability/reconfigurability of these functional circuit blocks, etc.).

Figure 4:
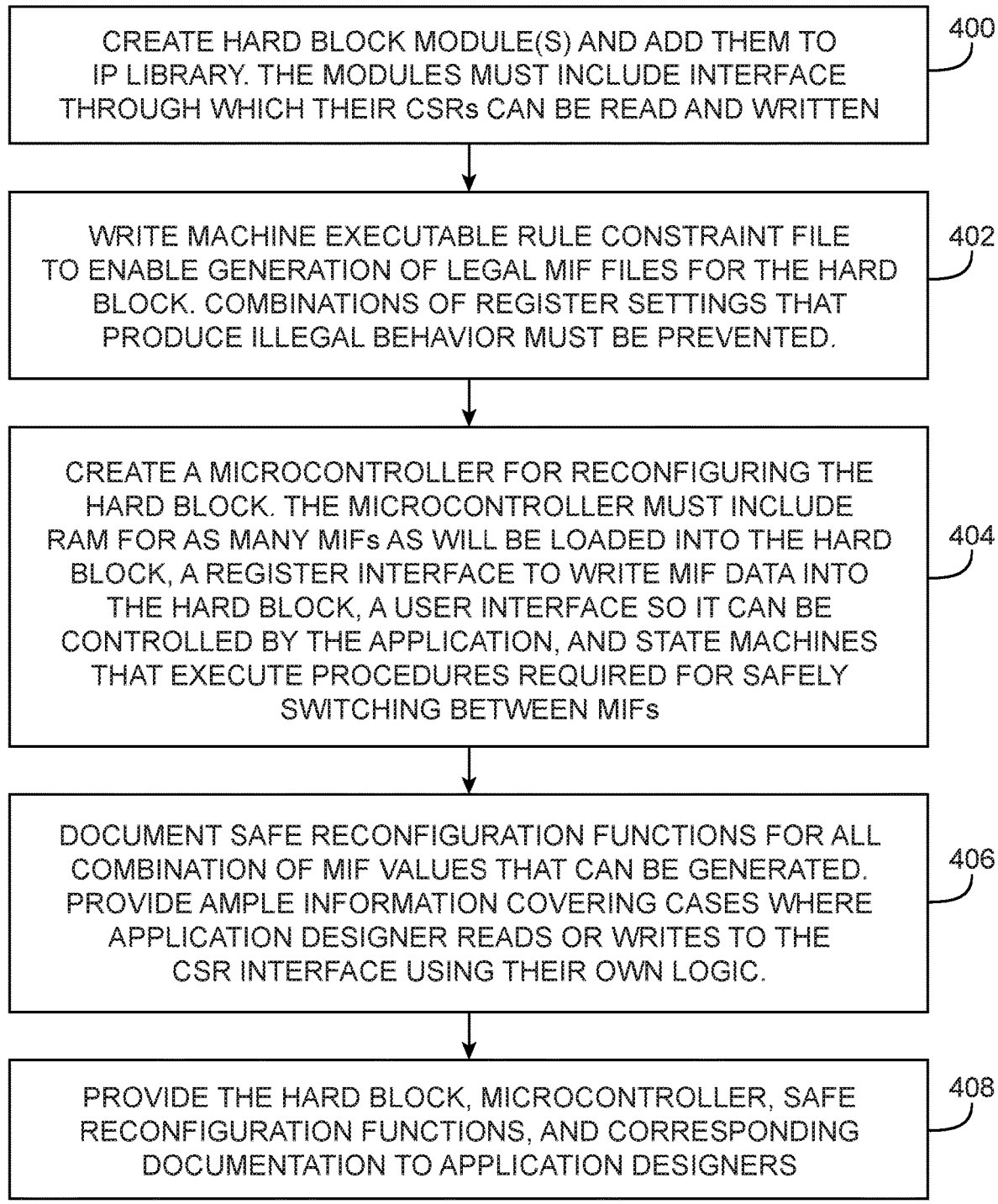
FIG. 4 is a flowchart of illustrative steps for creating functional circuit blocks in accordance with some embodiments.

FIG. 4 shows a flowchart of illustrative steps for creating these functional circuit blocks (e.g., IP blocks) using a circuit design system (e.g., using a design system having all of the functions of design system 300, having only some of the functions of design system 300, having some additional functions not described for design system 300).

At step 400, a user of the circuit design system (e.g., an IP designer) may create one or more hard block modules(s) (i.e., one or more components for functional circuit blocks) sometimes referred to as hard block subcomponents or simply subcomponents and add the one or more subcomponents to a circuit design library. These hard block subcomponents must include interfaces through which configuration state registers (CSRs) in these subcomponents can be accessed (e.g., read and written).

At step 402, the IP designer may write machine executable rule constraint files to enable generation of legal memory initialization files (MIFs) for the hard circuit block (sometimes referred to as hard block), and in particular, for each of the hard block subcomponents. As an example, combinations of (configuration) register settings (e.g., dictated by MIFs) for the hard block subcomponents that produce illegal behavior must be prevented.

At step 404, the IP designer may create a microcontroller (e.g., design and/or implement a microcontroller, if desired, using the circuit design system) for reconfiguring the hard block. The microcontroller must include sufficient memory (e.g., RAM) for as many MIFs as will possibly be loaded into the hard block (e.g., having any possible number of hard block subcomponents). The microcontroller must also include a register interface to provide data on MIFs into the hard block, a user interface so that the microcontroller can be controlled by an application (e.g., as designed by an application designer), and state machines that execute procedures required for safely (e.g., while avoiding illegal states) switching between different MIFs.

At step 406, the IP designer may document safe reconfiguration functions for all combination of MIF values that can be generated. The IP provider may have to provide ample information covering scenarios or cases where the application designer accesses (e.g., reads from or writes to) the register interfaces (e.g., CSR interfaces) using custom logic circuitry generated by the application designer.

At step 408, the IP designer may provide the hard circuit block having the hard block subcomponents (generated in step 400) and the microcontroller (created in step 404) to the application designers. As an example, the IP designer may provide implementation information or present instances or images for the hard block subcomponents and the microcontroller in a library useable by the application designers to generate custom logic circuits. The IP provider may also provide information for safe reconfiguration functions and corresponding documentation for the circuit block and circuit block subcomponents to the application designers (e.g., as part of the functional circuit block packages or IP block packages).

Figure 5:
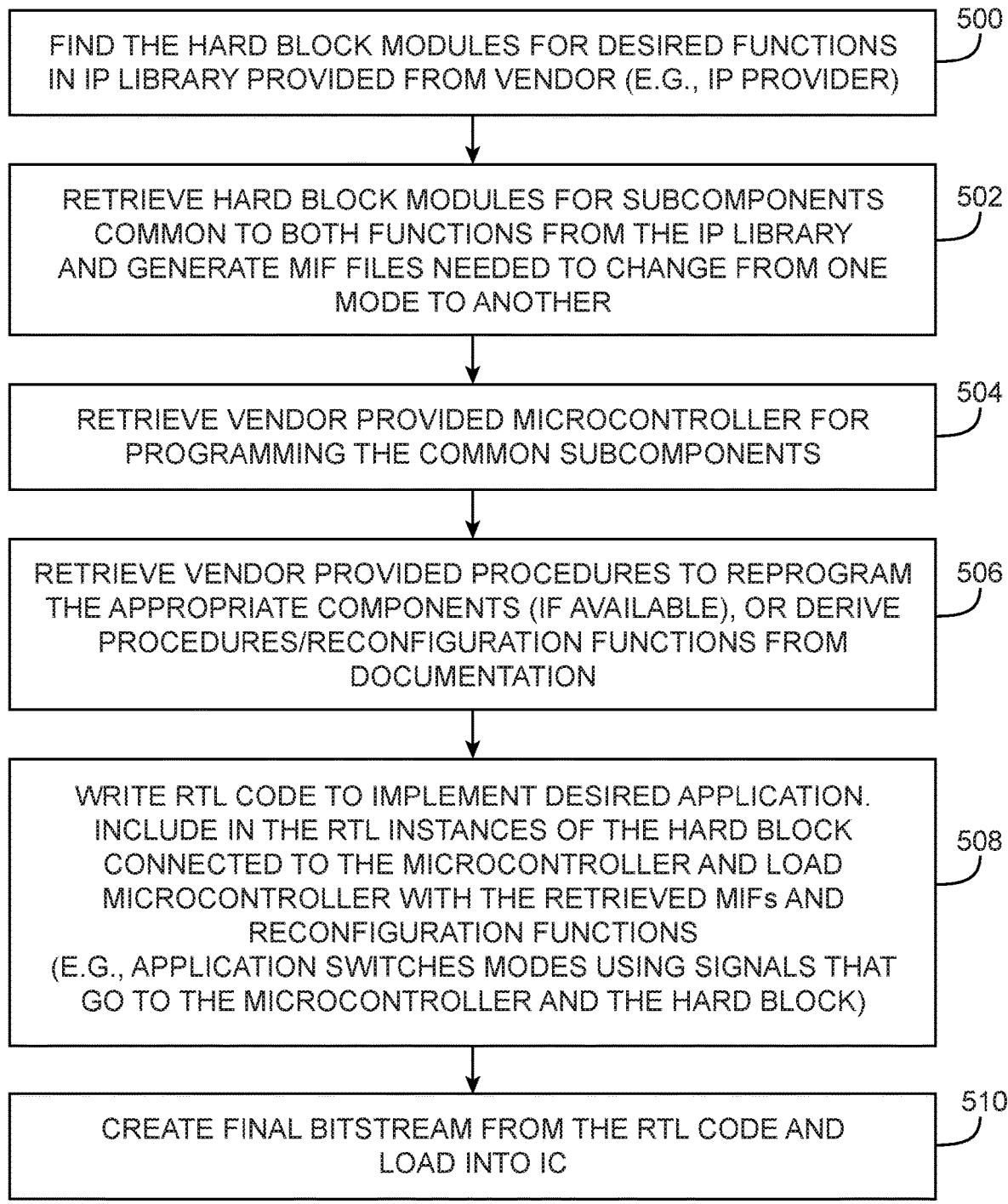
FIG. 5 is a flowchart of illustrative steps for generating integrated circuit configuration data to implement a custom logic function using functional circuit blocks in accordance with some embodiments.

FIG. 5 shows a flowchart of illustrative steps for designing and implementing custom logic circuits for an application based on the functional circuit block packages and/or IP block packages generated in the flowchart of FIG. 4 using a circuit design system such as circuit design system 300 in FIG. 3.

At step 500, a user of circuit design system 300 (e.g., an application designer) may find the hard block subcomponents for desired functions in the circuit design library provided from a vendor (e.g., an IP designer or provider).

At step 502, the application designer (using circuit design system 300) may retrieve hard block (sub)components common to multiple desired functions (e.g., a shared component for the hard block or general purpose circuitry for the hard block sometimes referred to herein as a high-level module for the hard block). The application designer may generate the MIFs need to change from one mode (associated with a subcomponent having a distinct non-general function) to another (associated with another subcomponent having a second distinct non-general function).

At step 504, the application designer may retrieve or implement the vendor provided microcontroller (using circuit design system 300, if desired) for programming the common subcomponents.

At step 506, the application designer may retrieve the vendor provided procedures (if available) to reprogram the appropriate (sub)components, or derive procedures/reconfiguration functions from documentation (using circuit design system 300, if desired).

At step 508, the application designer may write register transfer level (RTL) code to implement the desired custom logic functions for the application. In particular, the application designer may generate RTL code that includes instances of the hard circuit block connected to the microcontroller and may load the microcontroller with the retrieved MIFs and reconfiguration functions (e.g., such that the application functions include switching modes using signals that go to the microcontroller and the hard circuit block).

At step 510, the application designer may use design system 300 to create a final bitstream (i.e., configuration data) from the RTL code and load the final bitstream into an integrated circuit to implement the custom logic function for the application.

Using the steps described in connection with FIGS. 4 and 5, the IP providers (or generally users of the circuit design systems) may generate functional circuit blocks (e.g., ready-to-use circuit blocks each having a designated function) in a circuit design library, and the application designers (or generally other users of the circuit design systems) may use these ready-to-use circuit blocks in generating custom logic circuits having reconfigurability functions. However, the steps taken by the application designer are unnecessarily tedious. As examples, the application designer has to account for compatibility of subcomponents in hard circuit blocks, generate MIFs for these subcomponents in different modes (step 502), reprogram components or possibly derive reconfiguration procedures from documentation (step 506), interface with and program the microcontroller (steps 504 and 508), etc. These steps all provide undesirable overhead costs for developing custom logic circuits for an application. From the view of the IP providers, by allowing access to the inner-workings the hard block circuit blocks and hard circuit block subcomponents (e.g., via documentation, constraint files, specified safe reconfiguration functions, etc.), the IP providers undesirably expose sensitive information to outside parties (e.g., leading to undesired duplication and modification of sometimes proprietary functional circuit blocks).

Figure 6:
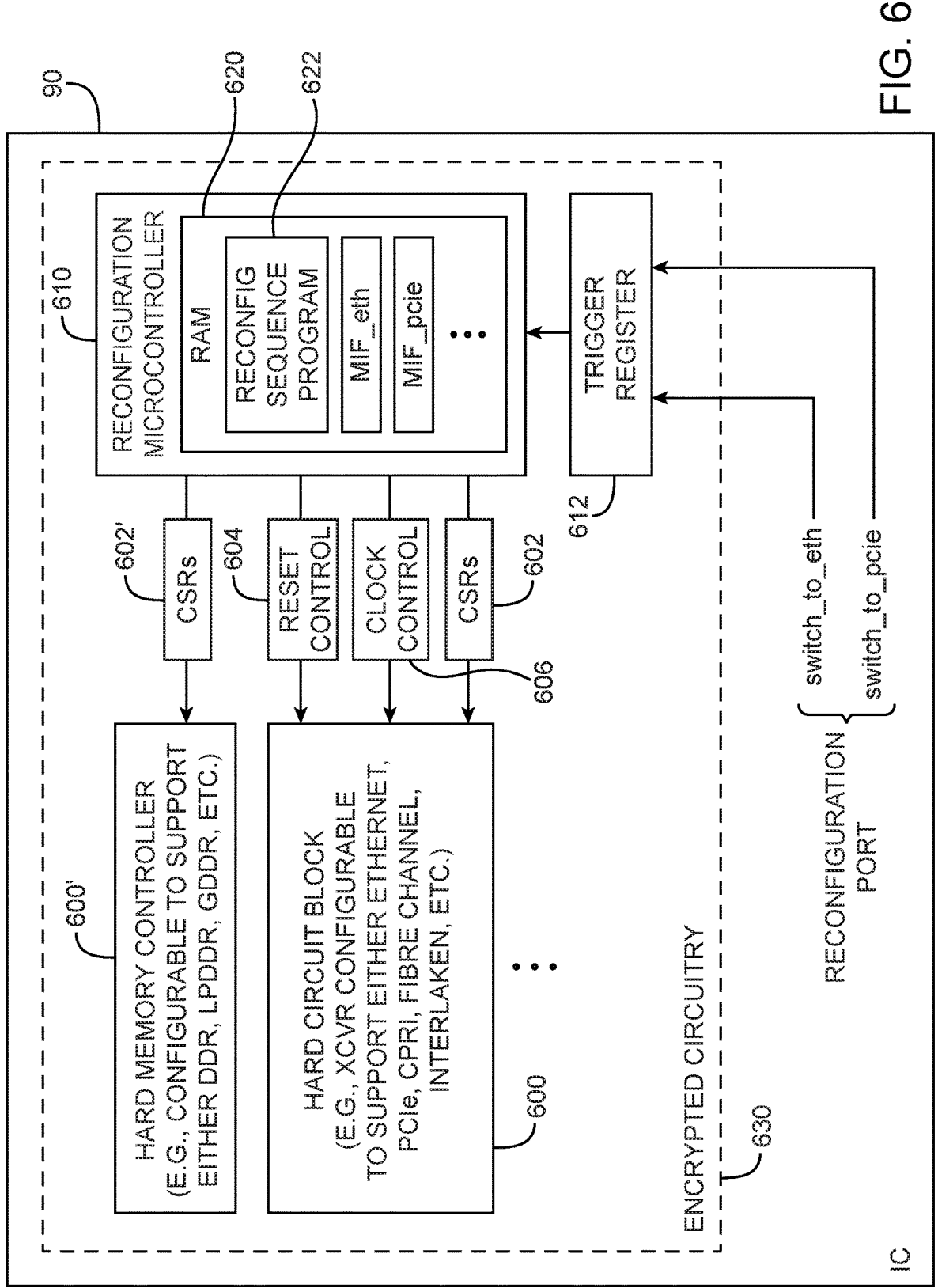
FIG. 6 is a diagram of an illustrative integrated circuit having functional circuit blocks with selective accessibility in accordance with some embodiments.

To mitigate these issues and securely provide functional circuit blocks and subcomponents for simplified custom logic design, improved integrated circuit design methodologies and systems are introduced. In particular, FIG. 6 shows an illustrative integrated circuit (e.g., integrated circuit 90) implemented with encrypted circuitry secure from tampering by outside parties and with easily accessible configuration inputs (e.g., a reconfiguration port) that simplify custom logic design. As examples, integrated circuit 90 may be a programmable integrated circuit such as integrated circuit 10 as described in FIGS. 1 and 2 or any other programmable logic device having a programmable function and/or may be a chiplet die. If desired, integrated circuit 90 may be implemented as any suitable type of integrated circuit such as a non-programmable integrated circuit.

As shown in FIG. 6, integrated circuit 90 may include functional circuit blocks (sometimes referred to as circuit blocks or IP blocks) such as functional circuit block 600 and functional circuit block 600'. In particular, circuit block 600 may be a hard communications circuit block implemented as a transceiver. The transceiver may be configurable to support one or more communications protocols such as Ethernet, Peripheral Component Interconnect express (PCIe), Common Public Radio Interface (CPRI), Fibre Channel, Interlaken, etc. Circuit block 600' may be a hard memory controller circuit block configurable to support one or more memory control protocols such as double data rate (DDR), lower power DDR (LPDDR), graphics DDR (GDDR), etc.

These circuit blocks 600 and 600' are merely illustrative. If desired, integrated circuit 90 may instead or additionally include any other types of functional circuit blocks such as general-purpose processing circuit block, video or graphics processing circuit block, signal conversion circuit block, interface circuit block, power management circuit block, timing management circuit block, etc. If desired, integrated circuit 90 may include soft circuit blocks (e.g., circuitry is programmable to serve different specified functions) and/or hard circuit blocks (e.g., circuitry that is not programmable and serves one or more functions that is inherent to the circuit block). If desired, one or more of these functional circuit blocks may be configurable to support different modes of operation and/or different operational protocols or standards.

Integrated circuit 90 may also include general purpose processing circuitry or control circuitry such as a microcontroller. The microcontroller may be a reconfiguration microcontroller such as reconfiguration microcontroller 610 that controls the operations of one or more functional circuit blocks (therefore sometimes referred to as support circuitry for the functional circuit blocks). To support the reconfiguration functions of microcontroller 610, microcontroller 610 may include memory circuitry such as RAM 620.

Memory circuitry 620 may store a reconfiguration sequence program that initializes a reconfiguration operation. The reconfiguration sequence program may include multiple reconfiguration functions that may each corresponding to a particular type of reconfiguration. As examples, a first reconfiguration function may be associated with reconfiguring a circuit block to operate in a first mode and a second reconfiguration function may be associated with reconfiguring the circuit block to operating in a second mode. Memory circuitry 620 may also include configuration data for the circuit blocks, and in particular, MIFs (configuration data) for subcomponents in the circuit blocks such as MIF MIF_eth and MIF MIF_pcie that provide configuration information to two subcomponents (Ethernet subcomponent PCIe subcomponent) in hard circuit block 600. If desired, integrated circuit 90 may include one or more additional microcontrollers to support circuit blocks other than circuit block 600. If desired, a first microcontroller may store the reconfiguration function and the configuration data for a first subcomponent and a second microcontroller may store the reconfiguration function and the configuration data for a second subcomponent (even while the first and second subcomponents are in the same hard circuit block).

As described in connection with FIG. 5 and elaborated in connection with FIG. 6, any given functional circuit block (e.g., blocks 600 or 600') may include a high-level module and multiple subcomponent modules (referred to simply as subcomponents). The high-level module may differ from the subcomponent modules in that the high-level modules are essential for operating the circuit block (e.g., serve clocking (timing) functions, power functions, interfacing functions, logic functions, control functions, etc.), while a subcomponent module is not a general-purpose module and serves an optional (replaceable) function (such as providing a particular protocol) which may be omitted in favor of another subcomponent module serving a different function (such as providing another protocol). These subcomponents modules may be activated and deactivated to implement desired functions of the hard circuit block, while the high-level module may remain active throughout.

In the example of FIG. 6, configuration (status) registers (CSRs) may be coupled between a given circuit block and a corresponding microcontroller and may be used to active and deactivate subcomponents in the given circuit block. In particular, one or more configuration registers 602 may be interposed between hard circuit block 600 and microcontroller 610. One or more configuration register 602' may be similarly interposed between memory controller 600' and microcontroller 610. However, this is merely illustrative. Since each set of configuration status registers may be integral to the operation of its corresponding hard circuit block, configuration registers may also be considered herein as part of the hard circuit block in some embodiments. As such, when a corresponding microcontroller provides configuration data to the configuration status register, this may be referred to as loading configuration information/data into the hard circuit block (e.g., the configuration status register of the hard circuit block).

A reset control circuit 604 and a clock control circuit 606 may be interposed between hard circuit block 600 and micro controller 610 along separate paths. These control circuits may be provided as necessary to accommodate the fixed functionalities of the circuit blocks. As an example, because circuit block 600 is a communications circuit block, control and monitoring circuits that control timing and reset are necessary.

Microcontroller 610 may provide control and data signals through configuration registers 602, reset control circuit 604, clock control circuit 606, and other circuits to implement a desired function (e.g., a function to reconfigure hard circuit block 600 to support different protocols) for hard circuit block 600. If desired, other circuit blocks may receive any combination of control circuits and output from configuration registers from a corresponding microcontroller. In some embodiments, hard memory controller 600' may also receive respective control signals through reset and clock control circuits from control circuitry.

Integrated circuit 90 may also include one or more trigger registers 612 coupled to microcontroller 610. Trigger registers 612 may receive (user-specified) inputs that provide microcontroller 610 with information regarding the desired operating modes of functional circuit blocks such as circuit block 600. In particular, each given trigger register may receive trigger signals that are mutually exclusive (e.g., trigger signals that correspond to different subcomponents that cannot be simultaneously active with one another). As an example, trigger register 612 may receive input signals switch_to_eth and switch_to_pcie from a reconfiguration port having at least two corresponding input paths. Based on the input signal, trigger register 612 may control microcontroller 610 to provide the corresponding control and (configuration) data signals to the corresponding functional circuit block (e.g., through control circuits 604 and 606 and configuration registers 602).

In the example of FIG. 6, when trigger register 612 receives an asserted version of signal switch_to_eth, trigger register 612 may provide an initiation signal to microcontroller 610 to initiate a reconfiguration operation to switch hard circuit block 600 to an Ethernet mode of operation. The reconfiguration operation may include executing at least a portion of reconfiguration sequence program 622 (e.g., a reconfiguration function for Ethernet mode) to load configuration file MIF_eth into hard circuit block 600 (e.g., to load configuration data to configuration registers 602 to activate a subcomponent module associated with an Ethernet protocol circuit and deactivate any conflicting subcomponent modules). When trigger register 612 receives an asserted version of another trigger signal (e.g., signal switch_to_pcie), a corresponding initiation signal may be provided to micro controller 610 to initiate the corresponding reconfiguration operation (e.g., to switch hard circuit block to a PCIe mode of operation).

In other words, trigger signals may be the only signals required to begin a reconfiguration operation of a hard circuit block as an asserted trigger signal such as one of signals switch_to_eth or switch_to_pcie initiates a cascading response through trigger register 612, microcontroller 610, control circuits 604 and 606, and configuration registers 602 to effect change in hard circuit block 600. By providing an integrated circuit with a reconfiguration port that receives different inputs (different trigger signals) corresponding to different desired reconfiguration operations, a user (e.g., an application designer) may implement reconfiguration functions without needing much knowledge of the inner-workings of circuit blocks, configuration registers, and support circuitry blocks as such reset and clock control circuits, a microcontroller, and any interconnections therebetween.

In some embodiments, one or more circuit blocks (e.g., circuit blocks 600 and 600', and configuration registers 602 and 602) and/or support circuitry of the circuit blocks (e.g., microcontroller 610, control circuits 604 and 606, and trigger registers 612) may be encrypted (as encrypted circuitry 630) to protect sensitive information such as implementation information of these circuitry. Because of the presence of a reconfiguration port accessible to an application (as designed by an application designer), the reconfigurability of hard circuit blocks remain intact even when the connections and configurations of the hard circuit blocks are abstracted away (e.g., encrypted) from the application designer, thereby also simply the custom logic design process for the application designer.

Figure 7:
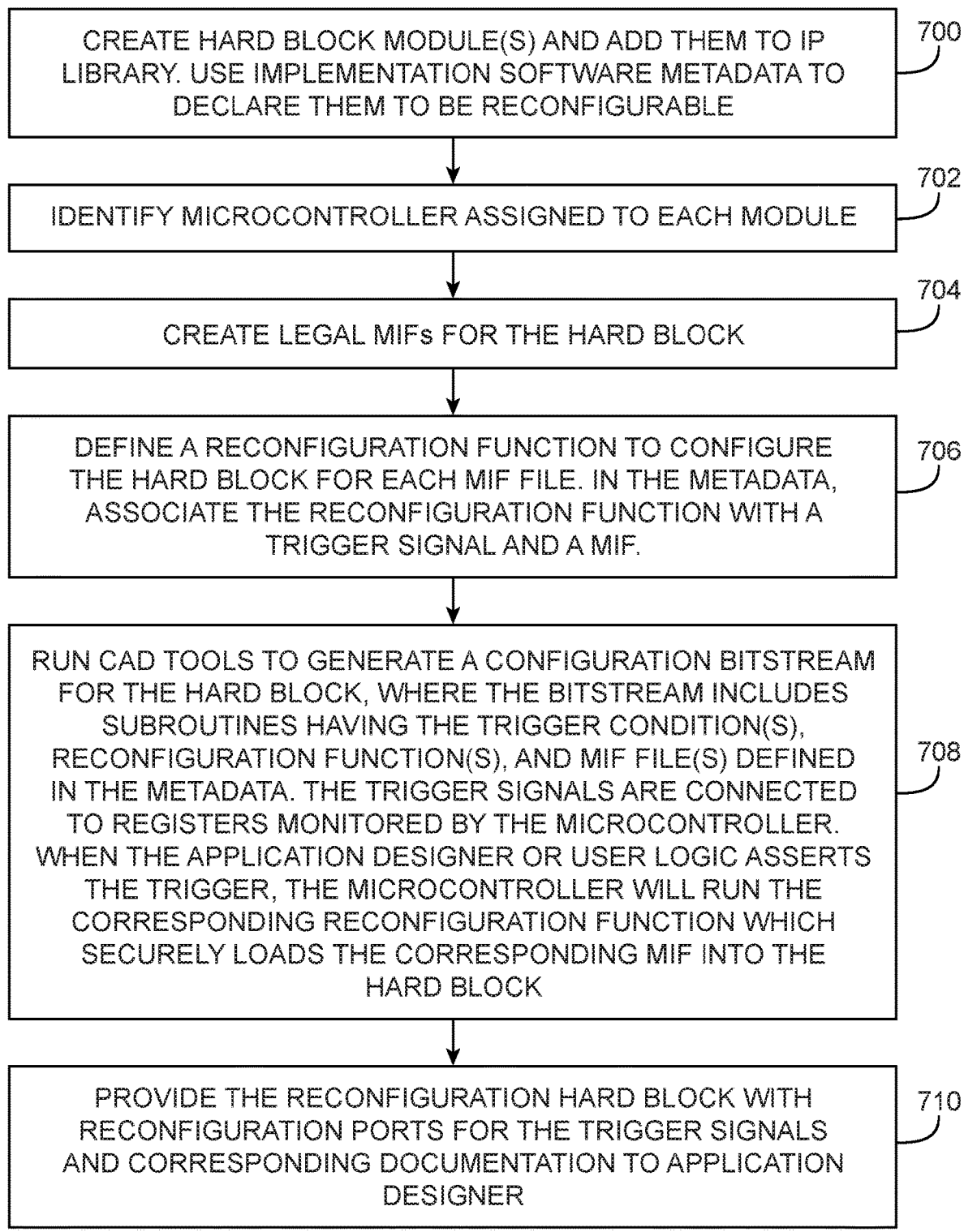
FIG. 7 is a flowchart of illustrative steps for creating functional circuit blocks on an integrated circuit of the type shown in FIG. 6 in accordance with some embodiments.

FIG. 7 shows a flowchart of illustrative steps for creating functional circuit blocks (e.g., a hard circuit block), subcomponents in the functional circuit blocks, and support circuitry (e.g., a microcontroller) such as those shown in FIG. 6.

At step 700, an IP designer or provider may use a circuit design system similar to that of circuit design system 300 in FIG. 3 to create one or more (hard) block modules (e.g., general-purpose high-level modules and subcomponent modules) and add the hard block modules to an IP library (e.g., a library of existing or pre-made circuit designs). The IP designer may use implementation software metadata to declare the subcomponent modules and/or the hard circuit block corresponding to the subcomponent modules to be reconfigurable (e.g., generate a metadata file that indicates the hard circuit blocks that are reconfigurable, generate a metadata file that indicates the subcomponent modules that are reconfigurable from one to another).

In an illustrative example, an IP designer may provide a communications hard circuit block reconfigurable to operate between Ethernet and PCIe modes. At step 700, the IP designer may begin with a high-speed serial transceiver as the initial building block for the hard circuit block (e.g., selected from a circuit design library or generated using another design entry method with design entry tools). If desired, the high-speed serial transceiver may be represented in RTL code, which also include instances for ports (for reading and writing serial data), control and monitoring circuits such as a reset signal and a communication locked indication signal (e.g., associated with control circuits 602 and 604 in FIG. 6), and other suitable circuitry.

At step 702, the IP designer may identify a microcontroller (on a target integrated circuit) assigned to each module (e.g., each functional circuit block, each reconfigurable module, each subcomponent module, etc.).

In the illustrative example, at step 702, the IP designer identify a microcontroller (e.g., microcontroller 610 in FIG. 6) that is located on the same (chiplet) die as the communications hard circuit block. The subcomponents for Ethernet and PCIe (sometimes referred to as Ethernet logic and PCIe logic, e.g., subcomponent modules for Ethernet and PCIe in hard circuit block 600 in FIG. 6) may be located on the same (chiplet) die and configured by the identified microcontroller. The IP designer may generate a metadata file identifying the hard circuit block and the microcontroller (and their association to each other).

At step 704, the IP designer may create legal MIFs (e.g., files containing configuration bitstreams/images to configure functional circuit blocks) for the one or more modules in corresponding hard circuit blocks created in step 700.

In the illustrative example, at step 704, the IP designer may generate configuration bitstreams/images (data) for the communications hard circuit block to operate in an Ethernet mode (e.g., MIF_eth in FIG. 6) and separately generate configuration data for the communications hard circuit block to operate in a PCIe mode (e.g., MIF_pcie in FIG. 6). These sets of configuration data may control the settings of configuration registers (e.g., configuration register 602 in FIG. 6) such that a first setting or state of the configuration registers is associated with MIF_eth and a second setting or state of the configuration registers is associated with MIF_pcie. These configuration data files may be stored on the microcontroller.

At step 706, the IP designer may define a reconfiguration function to configure the hard circuit block for each MIF. The IP designer may generate metadata for the reconfiguration function in the metadata file. In particular, the metadata may associate the reconfiguration function with the corresponding trigger signal and the corresponding MIF.

In the illustrative example, at step 706, the IP designer may generate (e.g., write) a reconfiguration function describing a series of read and write operations that the microcontroller performs to load configuration file MIF_eth into the communications hard circuit block and another reconfiguration function describing a series of read and write operations that the microcontroller performs to load configuration file MIF_pcie into the communications hard circuit block. These reconfiguration functions may be stored at the microcontroller (e.g., as reconfiguration sequence program 622 in FIG. 6). Additionally, the IP designer may add metadata to the metadata file associating an input at the reconfiguration port to the reconfiguration function and MIF for Ethernet (e.g., input receiving signal switch_to_eth) and associating an additional input at the reconfiguration port to the reconfiguration function and MIF for PCIe (e.g., input receiving signal switch_to_pcie).

At step 708, the IP designer may use CAD tools (e.g., CAD tools similar to those in design system 300 in FIG. 3) to generate a configuration bitstream representing the hard block module. The bitstream may also include information regarding subroutines having one or more trigger conditions (e.g., general-purpose steps to implement any reconfiguration operation stored as part of a reconfiguration sequence program), one or more reconfiguration functions, and one or more MIFs defined in the metadata file.

The trigger signals (e.g., trigger register 612 in FIG. 6) may be received by a register, which is monitored by the microcontroller (e.g., microcontroller 610 in FIG. 6). When an application designer or user logic asserts the trigger signal, the microcontroller may run the corresponding reconfiguration function, which securely loads the corresponding MIF into the hard circuit block.

In the illustrative example, at step 708, the IP designer may run implementation tools (e.g., CAD tools similar to those in design system 300). The IP provider may provide the implementation tools with the metadata file, the modules for the communications hard circuit block, the MIFs, and the reconfiguration functions. The implementation tools may in general generate a bitstream is used by the microcontroller to configurable portions of a programmable integrated circuit. In this case, the implementation tools may use the metadata in the metadata file to additionally generate code (e.g., functions or routines) for the microcontroller that includes the reconfiguration functions and the MIFs. Additionally, the output configuration data (e.g., which includes the additionally generated code) of the implementation tools may implement the reconfiguration port and trigger signals as direct inputs to the reconfigurable communications hard circuit block when an instance of the reconfigurable communications hard circuit block is created (by an applications designer).

If desired, the IP designer may optionally encrypt one or more portions of the output configuration data (using encryption circuitry). By encrypting the output configuration data, the configuration data may be only read by the implementation tools and/or by a target integrated circuit (having the corresponding decryption functions).

At step 710, the IP designer may provide the reconfigurable hard circuit block having a reconfiguration port for the trigger signals and corresponding documentation to a library of circuit designs (e.g., in entry aids for tools 340 in FIG. 3) and as part of other circuit design entry aids. A user of CAD tools having the library of circuit designs (e.g., an application designer) may use the reconfigurable hard circuit block to implement custom logic circuits (e.g., create an instance of the reconfigurable communications hard circuit block in the illustrative example).

Figure 8:
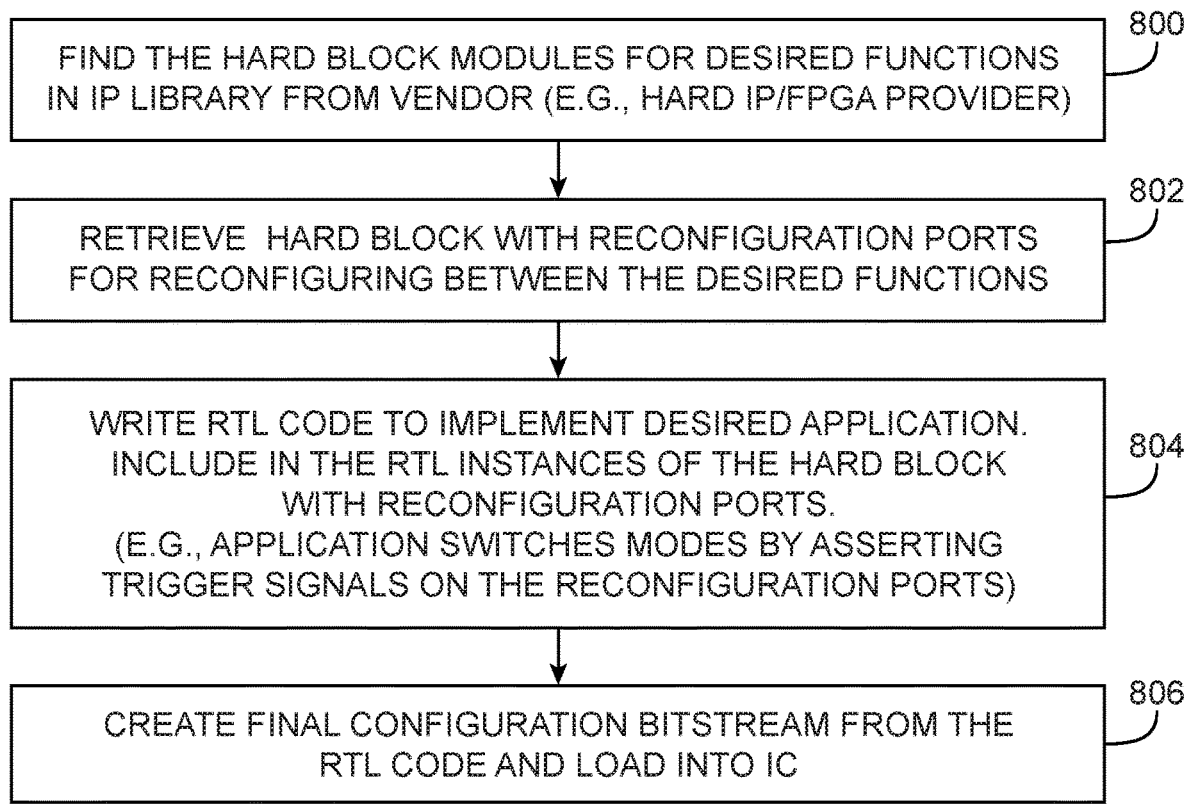
FIG. 8 is a flowchart of illustrative steps for generating integrated circuit configuration data to implement a custom logic function based on functional circuit blocks on an integrated circuit of the type shown in FIG. 6 in accordance with some embodiments.

FIG. 8 shows a flowchart of illustrative steps for creating custom logic circuits based on functional circuit blocks such as hard circuit blocks (e.g., a reconfigurable communications hard circuit block) and supporting circuitry (e.g., a microcontroller) such as those shown in FIG. 6.

At step 800, the application designer may find one or more the hard block modules in an IP library (e.g., a library of circuit designs obtained from a vendor such as a hard IP provider or a soft IP provider) for implementing desired custom functions in an application. As an example, the application designer may find a high-level module and one or more subcomponent modules for a reconfigurable functional circuit block (in a circuit design library, as an example).

At step 802, the application designer may retrieve the hard circuit blocks with reconfiguration ports for reconfiguring between the desired functions (e.g., by activating and deactivating select subcomponents in the hard circuit blocks).

At step 804, the application designer may write RTL code to implement the application. The application designer may include, in the RTL code, instances of the hard circuit block with reconfiguration ports. The application may switch between different modes of the hard circuit block by asserting the trigger signals on the reconfiguration ports. As an example, the application designer may generate an instance of the reconfigurable communications circuit block (e.g., in the RTL code) and couple the reconfiguration port of the instance of the reconfigurable functional circuit block to other suitable circuits that drive the input paths of the reconfiguration port.

At step 806, the application designer may create a final configuration bitstream from the RTL code and load the bitstream into an integrated circuit.

While the illustrative examples in FIGS. 6-8 describe hard circuit blocks in detail, this is merely illustrative. If desired, soft block modules or any other types of circuit blocks may also be generated, used, configured, or operated.

Integrated circuit generated in this way and integrated circuit design methodologies and systems implemented in this way allows a user (e.g., an application designer) to implement reconfiguration functions without needing much knowledge of the inner-workings of functional circuit blocks, support circuitry blocks, and any interconnections therebetween, thereby simplifying the circuit design process. Additionally, one or more circuit blocks and/or support circuitry of the circuit blocks may be encrypted to protect sensitive implementation information of an IP provider. Because of the reconfiguration port is accessible to a circuit design of an application designer, the reconfigurability of functional circuit blocks remain intact even when the connections and configurations of the hard circuit blocks are abstracted away (e.g., encrypted) from the application designer.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs), microcontrollers, microprocessors, central processing units (CPUs), graphics processing units (GPUs), etc. Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

EXAMPLES

The following examples pertain to further embodiments.

Example 1 is an integrated circuit, comprising: a hard circuit block operable in at least first and second modes; control circuitry that stores first and second configuration bitstreams; and a reconfiguration port that receives a first trigger signal that directs the control circuitry to use the first configuration bitstream to configure the hard circuit block in the first mode and that receives a second trigger signal that directs the control circuitry to use the second configuration bitstream to configure the hard circuit block in the second mode.

Example 2 is the integrated circuit of example 1, wherein only the first trigger signal is asserted during the first mode and wherein only the second trigger signal is asserted during the second mode.

Example 3 is the integrated circuit of any one of examples 1-2, wherein the reconfiguration port receives only trigger signals.

Example 4 is the integrated circuit of any one of examples 1-3, wherein the first trigger signal directs the control circuitry to initiate a first corresponding reconfiguration function that loads the first configuration bitstream into the hard circuit block, and wherein the second trigger signal directs the control circuitry to initiate a second corresponding reconfiguration function that loads the second configuration bitstream into the hard circuit block.

Example 5 is the integrated circuit of example 4, wherein the control circuitry comprises memory that stores the first and second configuration bitstreams and the first and second reconfiguration functions.

Example 6 is the integrated circuit of any one of examples 1-5, further comprising configuration status registers coupled between the hard circuit block and the control circuitry, wherein the configuration status registers determines whether the hard circuit block is configured in the first mode or the second mode.

Example 7 is the integrated circuit of example 6, wherein the hard circuit block and the control circuitry are encrypted such that the configuration status registers cannot be directly accessed other than by the control circuitry.

Example 8 is the integrated circuit of any one of examples 1-7, wherein the hard circuit block comprises a hard transceiver circuit block.

Example 9 is the integrated circuit of example 8, wherein the first mode and second modes comprise different communications protocols selected from the group consisting of: Ethernet, Peripheral Component Interconnect Express (PCIe), Common Public Radio Interface (CPRI), Fibre Channel, and Interlaken.

Example 10 is the integrated circuit of any one of examples 1-7, wherein the hard circuit block comprises a hard memory control circuit, and wherein the first and second modes comprise different memory protocols selected from the group consisting of: double data rate (DDR), lower power DDR (LPDDR), and graphics DDR (GDDR).

Example 11 is a method of using circuit design tools running on computing equipment to implement an integrated circuit, the method comprising: generating a hard circuit block configurable in at least first and second modes using a reconfiguration port that receives trigger signals, wherein the trigger signals is indicative of whether the hard circuit block operates in the first mode or the second mode; and providing the hard circuit block along with the reconfiguration port as part of a design library for implementing the integrated circuit.

Example 12 is the method of example 11, wherein the hard circuit block comprises first and second subcomponents respectively associated with the first and second modes and wherein providing the hard circuit block as part of the design library comprises providing the first and second subcomponents as part of the design library.

Example 13 is the method of example 12, further comprising: identifying a microcontroller associated with the first subcomponent, wherein the microcontroller is operable to control a state of the first subcomponent based on at least one trigger signal in the trigger signals.

Example 14 is the method of example 13, further comprising: generating a metadata file that associates the hard circuit block to the microcontroller.

Example 15 is the method of any one of examples 11-14, further comprising: generating first configuration data for configuring the hard circuit block in the first mode; and generating second configuration data for configuring the hard circuit block in the second mode, wherein control circuitry associated with the hard circuit block is operable to store the first configuration data and the second configuration data.

Example 16 is the method of example 15, further comprising: generating a first reconfiguration function associated with the first configuration data, wherein the control circuitry is operable to execute the first reconfiguration function to use the first configuration data to configure the hard circuit block in the first mode; and generating a second reconfiguration function associated with the second configuration data, wherein the control circuitry is operable to execute the second reconfiguration function to use the second configuration data to configure the hard circuit block in the second mode.

Example 17 is the method of example claim 16, wherein the control circuitry is operable to store the first reconfiguration function and the second reconfiguration function.

Example 18 is the method of any one of examples 16-17, further comprising: generating a metadata file that associates a first trigger signal in the trigger signals with executing the first reconfiguration function and using the first configuration data and that associates a second trigger signal in the trigger signals with executing the second reconfiguration function and the second configuration data.

Example 19 is a method of using a circuit design system to implement an integrated circuit, the method comprising: obtaining a hard circuit block configurable in at least first and second modes using a reconfiguration port, wherein the reconfiguration port receives a first control signal that configures the hard circuit block in the first mode and that receives a second control signal that configures the hard circuit block in the second mode; generating a configuration bitstream that creates an instance of the hard circuit block and the reconfiguration port; and loading the configuration bitstream onto the integrated circuit.

Example 20 is the method of example 19, wherein obtaining the hard circuit block comprises obtaining first and second subcomponents in the hard circuit block and obtaining the reconfiguration port, wherein the reconfiguration port is associated with the first and second subcomponents, wherein the first subcomponent is active and the second subcomponent is inactive in the first mode and the second subcomponent is active and the first subcomponent is inactive in the second mode.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. An integrated circuit, comprising:
   a hard circuit block operable in at least first and second modes;
   control circuitry that stores first and second configuration bitstreams;
   a reconfiguration port that receives a first trigger signal that directs the control circuitry to use the first configuration bitstream to configure the hard circuit block in the first mode and that receives a second trigger signal that directs the control circuitry to use the second configuration bitstream to configure the hard circuit block in the second mode; and
   configuration status registers coupled between the hard circuit block and the control circuitry, wherein the configuration status registers determine whether the hard circuit block is configured in the first mode or the second mode.

2. The integrated circuit of claim 1, wherein only the first trigger signal is asserted during the first mode and wherein only the second trigger signal is asserted during the second mode.

3. The integrated circuit of claim 1, wherein the reconfiguration port receives only trigger signals.

4. The integrated circuit of claim 3, wherein the first trigger signal directs the control circuitry to initiate a first corresponding reconfiguration function that loads the first configuration bitstream into the hard circuit block, and wherein the second trigger signal directs the control circuitry to initiate a second corresponding reconfiguration function that loads the second configuration bitstream into the hard circuit block.

5. The integrated circuit of claim 4, wherein the control circuitry comprises memory that stores the first and second configuration bitstreams and the first and second reconfiguration functions.

6. The integrated circuit of claim 1, wherein the hard circuit block and the control circuitry are encrypted such that the configuration status registers cannot be directly accessed other than by the control circuitry.

7. The integrated circuit of claim 1, wherein the hard circuit block comprises a hard transceiver circuit block.

8. The integrated circuit of claim 7, wherein the first mode and second modes comprise different communications protocols selected from the group consisting of: Ethernet, Peripheral Component Interconnect Express (PCIe), Common Public Radio Interface (CPRI), Fibre Channel, and Interlaken.

9. The integrated circuit of claim 1, wherein the hard circuit block comprises a hard memory control circuit, and wherein the first and second modes comprise different memory protocols selected from the group consisting of: double data rate (DDR), lower power DDR (LPDDR), and graphics DDR (GDDR).

10. A method of using circuit design tools running on computing equipment to implement an integrated circuit, the method comprising:
    generating a hard circuit block configurable in at least first and second modes using a reconfiguration port that receives trigger signals, wherein the trigger signals is indicative of whether the hard circuit block operates in the first mode or the second mode;
    generating configuration status registers coupled to the hard circuit block, wherein the configuration status registers determine whether the hard circuit block is configured in the first mode or the second mode; and
    providing the hard circuit block along with the configuration status registers and the reconfiguration port as part of a design library for implementing the integrated circuit.

11. The method of claim 10, wherein the hard circuit block comprises first and second subcomponents respectively associated with the first and second modes and wherein providing the hard circuit block as part of the design library comprises providing the first and second subcomponents as part of the design library.

12. The method of claim 11, further comprising:
identifying a microcontroller associated with the first subcomponent, wherein the microcontroller is operable to control a state of the first subcomponent based on at least one trigger signal in the trigger signals.

13. The method of claim 12, further comprising:
generating a metadata file that associates the hard circuit block to the microcontroller.

14. The method of claim 10, further comprising:
generating first configuration data for configuring the hard circuit block in the first mode; and
generating second configuration data for configuring the hard circuit block in the second mode, wherein control circuitry associated with the hard circuit block is operable to store the first configuration data and the second configuration data.

15. The method of claim 14, further comprising:
generating a first reconfiguration function associated with the first configuration data, wherein the control circuitry is operable to execute the first reconfiguration function to use the first configuration data to configure the hard circuit block in the first mode; and
generating a second reconfiguration function associated with the second configuration data, wherein the control circuitry is operable to execute the second reconfiguration function to use the second configuration data to configure the hard circuit block in the second mode.

16. The method of claim 15, wherein the control circuitry is operable to store the first reconfiguration function and the second reconfiguration function.

17. The method of claim 15, further comprising:
generating a metadata file that associates a first trigger signal in the trigger signals with executing the first reconfiguration function and using the first configuration data and that associates a second trigger signal in the trigger signals with executing the second reconfiguration function and the second configuration data.

18. A method of using a circuit design system to implement an integrated circuit, the method comprising:
obtaining a hard circuit block configurable in at least first and second modes using a reconfiguration port, wherein the reconfiguration port receives a first control signal that configures the hard circuit block in the first mode and that receives a second control signal that configures the hard circuit block in the second mode;
generating a configuration bitstream that creates an instance of the hard circuit block and the reconfiguration port; and
loading the configuration bitstream onto configuration status registers coupled to the hard circuit block, wherein the configuration status registers determine whether the hard circuit block is configured in the first mode or the second mode.

19. The method of claim 18, wherein obtaining the hard circuit block comprises obtaining first and second subcomponents in the hard circuit block and obtaining the reconfiguration port, wherein the reconfiguration port is associated with the first and second subcomponents, wherein the first subcomponent is active and the second subcomponent is inactive in the first mode and the second subcomponent is active and the first subcomponent is inactive in the second mode.

* * * * *